(12) United States Patent
Kia

(10) Patent No.: US 12,322,216 B2
(45) Date of Patent: *__Jun. 3, 2025__

(54) ARTIFICIAL INTELLIGENCE-BASED TIMING, IMAGING, AND TRACKING SYSTEM FOR THE PARTICIPATORY ATHLETIC EVENT MARKET

(71) Applicant: ACTIVE TRACK, LLC

(72) Inventor: Arash Kia, Portland, OR (US)

(73) Assignee: ACTIVE TRACK, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,983

(22) Filed: Oct. 24, 2022

(65) Prior Publication Data

US 2023/0298389 A1 Sep. 21, 2023

Related U.S. Application Data

(63) Continuation of application No. 17/107,529, filed on Nov. 30, 2020, now Pat. No. 11,501,582.

(60) Provisional application No. 62/942,156, filed on Dec. 1, 2019.

(51) Int. Cl.
*G07C 1/24* (2006.01)
*G06K 7/14* (2006.01)
*G06K 19/06* (2006.01)
*G06V 40/20* (2022.01)
*G06V 40/16* (2022.01)

(52) U.S. Cl.
CPC ............. *G07C 1/24* (2013.01); *G06K 7/1417* (2013.01); *G06K 19/06037* (2013.01); *G06V 40/25* (2022.01); *G06V 40/172* (2022.01)

(58) Field of Classification Search
CPC .. G07C 1/24; G06K 7/1417; G06K 19/06037; G06V 40/25
See application file for complete search history.

(56) References Cited

U.S. PATENT DOCUMENTS

2016/0232685 A1* 8/2016 Hefetz .................... G06T 7/90

* cited by examiner

*Primary Examiner* — Hongmin Fan
(74) *Attorney, Agent, or Firm* — FisherBroyles, LLP

(57) ABSTRACT

A system for tracking competitors conducting a race on a track includes multiple object-recognition devices positioned to recognize objects at predetermined locations along the track. The object-recognition devices are configured to recognize at least one physical feature of each of the competitors. A processing device is configured to determine a time at which a competitor reached a selected one of the predetermined locations during the race based on object-recognition data from at least one of the object-recognition devices. A transmitter is configured to transmit to an output device the time at which the competitor reached the selected location during the race.

20 Claims, 2 Drawing Sheets

Figure 1:
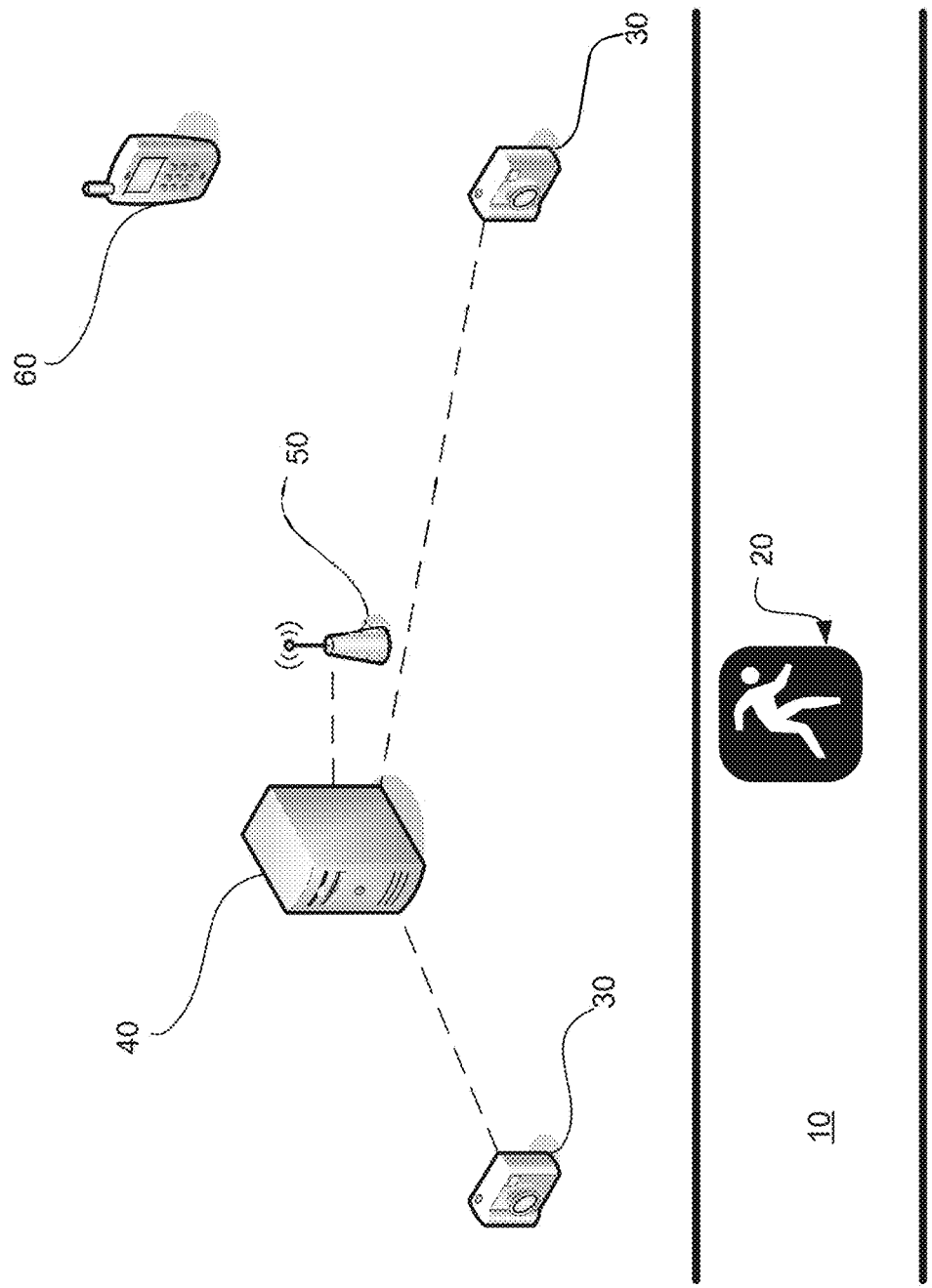

ARTIFICIAL INTELLIGENCE-BASED TIMING, IMAGING, AND TRACKING SYSTEM FOR THE PARTICIPATORY ATHLETIC EVENT MARKET

PRIORITY CLAIM

This application is a continuation of U.S. patent application Ser. No. 17/107,529 filed Nov. 30, 2020, which application claims priority to U.S. Provisional Patent Application Ser. No. 62/942,156 filed Dec. 1, 2019, the contents of which are hereby incorporated by reference as if fully set forth herein.

COPYRIGHT NOTICE

This disclosure is protected under United States and/or International Copyright Laws. © 2022 ACTIVE TRACK LLC. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

In the participatory endurance event business, there are race calendars, registration services, and timing companies with data that doesn't get handed down seamlessly, efficiently, and in a quick, reliable, and streamlined manner. That means sign up data and timing data are not processed as if they belong to the same system. There are manual handovers and spreadsheets requiring human intervention along the way.

One process starts with a participant searching for an event, registering by entering personal data and contact information, getting a receipt, printing it and bringing the receipt to the expo the day before the race. Packet pick-up is typically never fast, efficient, or connected. There is human intervention and spreadsheets with names to cross off as people check in. After check-in, the participant is given a race number and that number is recorded so that the name of the participant stays associated with the race number. Up to this point, the process typically has been slow, involved, and not connected. There is also human intervention with connecting the race number with the name. On the race course, the timing is done through the person's name being tied to a race number with an RFID chip that is programmed to have the electronic code as the actual number on the race bib.

As such, each step of the process requires a number of different data collected all for the sake of identifying, charging, assigning a race number, and timing a participant on the course. There are the personal information steps when searching and registering for a race, there is check-in with a driver's license or another ID, and then there is a connection to the RFID race bib.

Prior generations using RFID are well-known in the prior art involving the tracking/timing of participants in athletic events. Previous systems encode IDs into chips that then are placed onto running bibs or race numbers. Manufacturing of RFID, encoding of the RFID tags, and printing of the RFID tags onto race bibs all cost considerable amounts of money. Other embodiments of the art utilize active battery powered RFID tags, which provide a stronger signal from the bib and a longer range for detection. The electronics cost money, pollute the environment, create many man-hours of overhead, and create unnecessary waste. In addition, the encoding process is a long and time-consuming process and requires many man hours to manage. RFID timing systems use a chip encoded with a known ID that often matches the bib number. These systems require RF based antennas to detect and capture IDs going over them.

BRIEF DESCRIPTION OF THE DRAWING FIGURES

Figure 2:
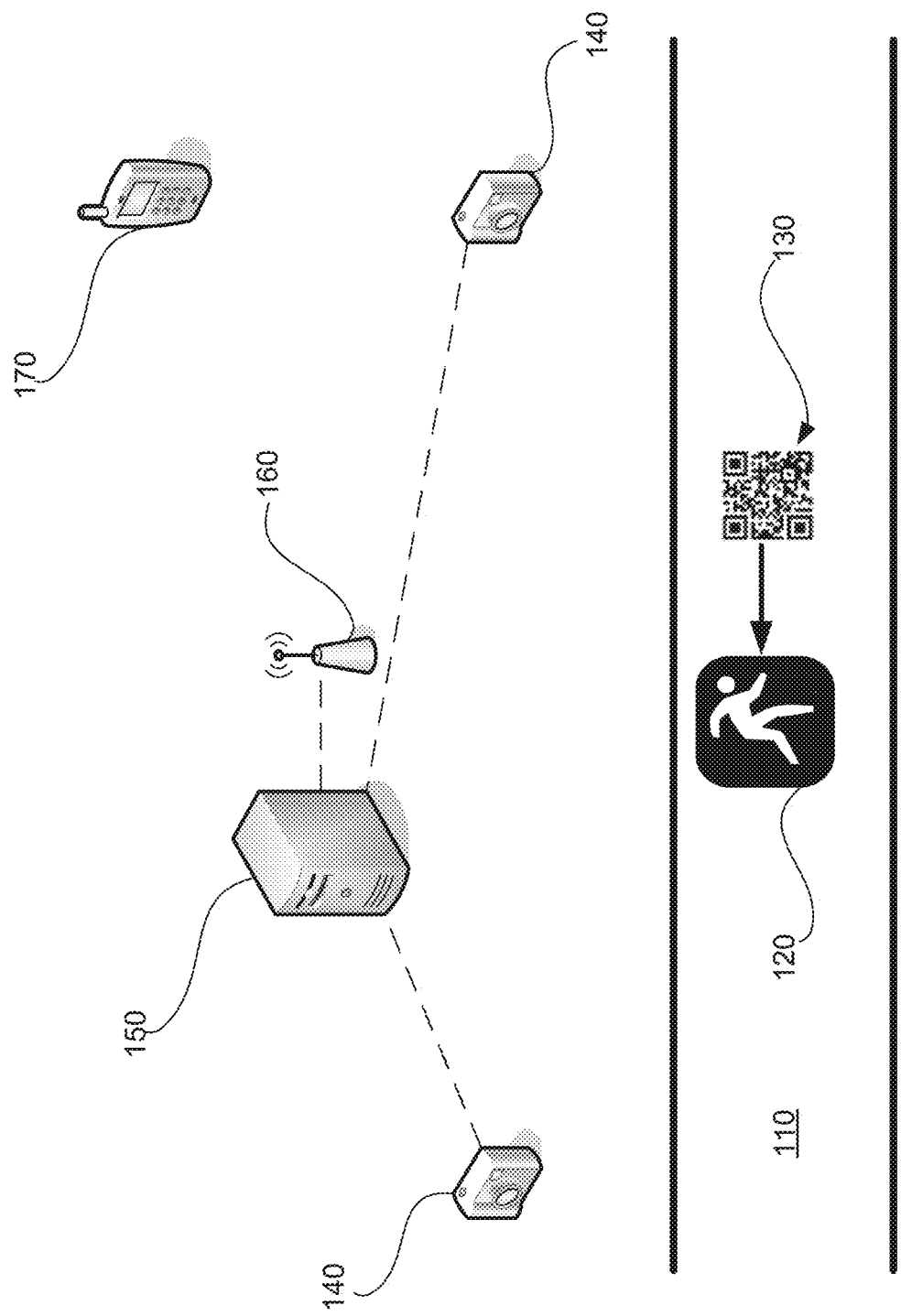

FIG. 1 illustrates a first embodiment of the invention; and
FIG. 2 illustrates an alternative embodiment of the invention.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications. The term "detection" refers to detecting a face in the scene displayed on the camera display. The term "identification" refers to identifying the person whose face was detected by the camera.

In an embodiment, the cameras can capture and upload the raw race course data to one or more Cloud servers through an internet connection. The connection could come through cellular, cable, Wi-Fi, connected or wireless, or through any other communication channel and protocol where the images from the cameras are sent to a cloud server for processing. In this embodiment, the need for an onsite server or laptop as a device to identify and assign time stamps to each recognized face, would be eliminated. This processing of data, which includes detection and identification of runners and recording of crossing time at the respective checkpoint, may all transition to the cloud server. An advantage of this method would be less equipment to carry around and use of a central reliable source for processing of a critical function of the timing system.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment of the invention involves the timing and tracking of participants in athletic events. As described below, the invention delivers richer content, enhances communication through visual display of artificial-intelligence video feed and analysis thereof. Video content can be delivered to a participant's family, providing race course images at the finish line in real time. In an embodiment, bibs have no chips built in. Participants are identified using face recognition cameras that identify the runners by matching their facial features to a known data set of participants who have been placed into the timing systems as a list of known participants. Additionally, the cameras can read the bib numbers and record them as a second method of identifying the participants.

One or more embodiments of the invention are tag-less and unlike the RFID timing system don't require anything hanging from the runner that is emitting signals or modulating fields. There are also no antennas on the street or other RF fields that participants have to run through.

A preferred embodiment of the invention times and tracks participants in events such as running races (i.e., marathons, half marathons, etc.) through artificial intelligence so that a better participant experience is provided. An embodiment provides richer content, faster delivery for the participants, and less overhead, less cost, and higher accuracy for the race directors and race timers.

Referring to FIG. 1, a process and system according to an embodiment includes defining a track 10 on which competitors 20 will conduct a race. Multiple object-recognition devices 30, such as cameras, are positioned at predetermined locations along the track 10. The object-recognition devices 30 are configured to recognize at least one physical feature of each of the competitors 20, such as, for example, the face of the competitor. Based on object-recognition data received by a processing device 40, such as a server, from at least one of the object-recognition devices 30, a time at which a competitor 20 reached a selected one of the predetermined locations on the track 10 during the race is determined. The time at which the competitor 20 reached the selected location during the race is then transmitted via a transmitting device 50 to an output device 60, such as a smart phone using Bluetooth, wifi, cellular or the like. In an alternative embodiment, the processing device 40 includes the transmitting device 50.

Referring to FIG. 2, a process and system according to an embodiment includes defining a track 110 on which competitors 120 will conduct a race. A respective different quick response (QR) code 130 is attached to each of the competitors 120. Each QR code 130 identifies the competitor 120 to which it is attached. One or more reader devices 140 is positioned at one or more locations along the track 110. The one or more devices 140 are configured to read the QR code 130 attached to each of the competitors 120. Based on data received by a processing device 150, such as a server, from at least one of the reader devices 140, a time at which a competitor 120 reached a selected one of the locations on the track 110 during the race is determined. The time at which the competitor 120 reached the selected location during the race is then transmitted via a transmitting device 160 to an output device 170, such as a smart phone using Bluetooth, wifi, cellular or the like. In an alternative embodiment, the processing device 150 includes the transmitting device 160. In an alternative embodiment, the QR codes are positioned on the competitor to be pointed up and the cameras would be positioned above the competitor and pointed down. Prior systems use technology to photograph runners on the race course. These systems place a proprietary 2-D code on the bib and scan the code on the race course solely to ID the runners. The code reflects the runner's bib number and uses that bib number identification to help determine whose picture is being taken. In such systems, cameras are positioned only a few feet down the road and are pointed horizontally towards the runners. As a result, they cannot time people accurately when people cross timing checkpoints. However, these methods are not intended for or capable of timing and do not work in a mass and crowded start line where people block each other. In contrast, in this embodiment, the code (QR or otherwise) is positioned on the competitors' shoulder or the bill of their cap and make the code pointed up. Then cameras are installed about 8 feet high or so and have the lenses pointed down. With the cameras positioned above the timing checkpoint and QR codes pointed up towards them, this embodiment enables race organizers to not only ID competitors, but also to time them simultaneously.

A process according to an embodiment begins by capturing images of participants during the registration/packet pickup of the event. The participant may stand in front of one or more cameras that snap a picture to compare against images collected on the event course. On event day, the camera can perform a tripwire function where a runner's time stamp is registered and saved on a nearby server when any part of the runner's body crosses over a line drawn on the monitor of the hardware connected to the camera. The imaginary line could be drawn on the monitor screen of the attached hardware. The line could be one and the same as the starting line by drawing it right on top of where the actual starting line is geographically located. Cameras perform facial detection and send the detected images to a nearby connected server or to a cloud server for storage and subsequent identification. The identification process is performed by comparing the biometric data of a participant's face to the many entered into the database during the registration or the check-in process.

One or more embodiments include bringing artificial intelligence to the participant's experience at a participatory athletic event such a marathon or a triathlon. In an embodiment, participant's biometric data, which can include a combination of facial features unique to a single person, can be captured into a participant database during packet pickup, or even sooner when the participant registers for an event through a smart phone app. On the day of the event, at the starting line, the embedded face recognition technology in the camera can identify the participants at the start line of a race. Frames of video from the start line can be saved on a network server and then rescanned for any faces that may not have been detected by artificial intelligence in the cameras. The group of participants not identified or even not detected at the start line can be detected when they cross a later checkpoint along the event course. For this reason, a rescan of the start line may be necessary against participants detected at a later checkpoint. Any participant crossing a checkpoint who does not have a start time can be tagged as a participant who was possibly missed at the start line. Additional graphic tools and methods can be utilized to match the known misses against the captured video of start line participants. These graphic tools can manually connect a detected participant to an individual at the start line.

In an embodiment of the imaging application of this technology, a participant would be identified along the event course and actual video of the participant plus positional and displacement information could be transmitted to the participant's family. Additionally, images of the participants could be taken and stored on the cloud for later viewing and purchase. At the finish, a kiosk equipped with an artificial-intelligence camera, can identify a participant in front of the kiosk and offer to sell them still images and their finish line video clip from the race course. The participants could have the option of paying for and printing the images in real time and saving the hassle of ordering online and having the pictures delivered to their home.

In addition, at the finish line each participant can be profiled for the products they wear, gear they use, and some information about their personal preferences which could be saved for promotional purposes. Each finisher can receive a completion time for the distance that was travelled, plus split times at any checkpoint along the way.

In an embodiment of the usage of the facial recognition data, the same facial data used for identification of participants along the event course, or at the photo-video kiosk, would be used to register a participant for an event. In one embodiment, the registration process would use a smart phone application, capable of showing and filtering through a calendar of participatory athletic event, and allowing the user to register for a desired event by selecting an event from the calendar of events. Upon the request to register, the person's mailing address and contact information would be recorded and the person would be charged an entry fee granting them entry to participate in the event. This same facial biometric data would be used during the participant check-in, on the course, and at the photo-video kiosk.

An embodiment of the invention includes a method of applying artificial-intelligence technology to timing running and endurance races, customized software, and algorithms to handle missed individuals. Start line images at a rate of 20 to 30 frames per second, and would rescan the start line images in a mission critical approach where a person detected at a later checkpoint could be targeted for detection at the start line. The missed start line participants would be identified through the use of video data from checkpoints midway through the course, and the finish line video. Through the utilization of filtering mechanisms and search routines, participants of the same gender, same clothing style, shoes, headwear, apparel color, or any other identifiable feature could be tracked down.

In another embodiment, the camera could capture the participant bib number and use it to identify the participant. Each participant could be assigned a bib with a unique number on the bib that the artificial intelligence cameras of the timing system would be able to read and understand. To date no such system exists in the running industry where cameras capture bib numbers and identify participants. Both face recognition and bib number capture can be used to make sure the rate of identification is maximized.

An embodiment can handle all the steps to make the entire process efficient and streamlined. An embodiment provides a new and modern registration service with a list of possible events to register for where each event may have a mark that would be identifiable with a smart phone (e.g., a QR code). An embodiment might include an application, such as for a smart phone or other portable electronic device, in which the registrant may scan the QR code and get registered for the event. Then during expo check in, the participant is again identified because their picture was saved into the "cloud" through the use of smart phone application. In an embodiment, the participant would be photographed with the artificial intelligence cameras right after a bib number is handed to the participant. The camera, whether on the kiosk or a smart phone admin phone, would be able to read the assigned bib number and record it. Other checks and balances would be performed to verify the participant would be running in the correct event. In this embodiment the registration process would be streamline, sped up, and would again tap into the same data as registration, image search, and timing system identification. All the long lines at check in would disappear and the same data is shared among the many systems and steps of the process.

In the process according to an embodiment, if someone shows up without a smart phone, an embodiment may include providing admin smart phones that could register a third party into the race or get an athlete checked in. One step could include having the athlete have their image captured while holding their bib for identification on the race course. This approach would let the timing system update the face image so the latest face image could be used for detection on the race course.

One approach according to an embodiment could put a QR code matching the runner bib number on the runner garment and then read the code optically right at the start line.

The cameras can identify an object as being a human, they can watch it cross a boundary, and they can do facial recognition on it. The cameras may have a time delay associated with them for determining a humanoid from a car or a tree. When the tree moves in the wind, they ignore the movement. The camera can do facial recognition and boundary crossing of the start line at the same time. The same camera could have the ability to read bib numbers. Such a function is incorporated into the AI of the camera.

While the preferred embodiment of the invention has been illustrated and described, as noted above, many changes can be made without departing from the spirit and scope of the invention. For example, one or more embodiments may provide a larger usage of the system data so that other steps in getting an athlete signed up and checked in could be performed with the use of the same facial data. Accordingly, the scope of the invention is not limited by the disclosure of the preferred embodiment. Instead, the invention should be determined entirely by reference to the claims.

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method, comprising:
    defining a track on which competitors will participate in a race;
    positioning, at each of multiple locations along the track, an object-recognition device configured to recognize at least one physical feature of each of the competitors; and
    based on object-recognition data from the object-recognition device positioned at a selected one of the locations, determining a time at which a competitor reaches the selected one of the locations during the race.

2. A system for tracking competitors participating in a race on a track, the system comprising:
    one or more object-recognition devices positioned at locations along the track, the object-recognition devices configured to recognize at least one physical feature of each of the competitors; and
    a processing device configured to determine a time at which a competitor reaches a selected one of the locations during the race based on object-recognition data from at least one of the one or more object-recognition devices.

3. The method of claim 1, further comprising:
    capturing, as the object-recognition data with the object-recognition device, an image of a face of the competitor; and
    recognizing, with the object-recognition device in response to the captured object-recognition data, the competitor by comparing the captured image of the face to stored representations of faces of the competitors.

4. The method of claim 3, further comprising storing the representations of the faces of the competitors in a local memory or in a cloud memory.

5. The method of claim 1, further comprising:
    capturing, as the object-recognition data with the object-recognition device, an image of a face of the competitor;
    extracting, from the captured image, biometric data related to the face; and
    recognizing, with the object-recognition device in response to the captured object-recognition data, the competitor by comparing the extracted biometric data to stored biometric data related to the faces of the competitors.

6. The method of claim 5, further comprising storing the biometric data related to the faces of the competitors in a local memory or in a cloud memory.

7. The method of claim 1, further comprising:
    capturing, as the object-recognition data with the object-recognition device, an image of a face of the competitor;
    recognizing, with the object-recognition device in response to the captured object-recognition data, the competitor by comparing the captured image of the face of the competitor to stored representations of faces of the competitors; and
    associating, with the recognized competitor, the determined time at which the recognized competitor reaches the selected one of the locations.

8. The method of claim 7, further comprising transmitting the associated determined time to an output device associated with the recognized competitor.

9. The method of claim 7, further comprising transmitting the associated determined time to a smart phone associated with the recognized competitor.

10. The method of claim 1, further comprising:
capturing, as the object-recognition data with the object-recognition device, an image of a face of the competitor;
recognizing, with the object-recognition device in response to the captured object-recognition data, the competitor by comparing the captured image of the face to stored representations of faces of the competitors; and
identifying images captured during the race and in which the competitor appears.

11. The method of claim 10, further comprising offering for sale to the competitor at least one of the identified images.

12. The system of claim 2 wherein the one or more object-recognition devices are configured:
to capture, as the object-recognition data, an image of a face of the competitor; and
to recognize the competitor by comparing the captured image of the face to stored representations of faces of the competitors.

13. The system of claim 12, further comprising a local memory or a cloud memory configured to store the representations of the faces of the competitors.

14. The system of claim 2 wherein:
the one or more object-recognition devices are configured to capture, as the object-recognition data, an image of a face of the competitor; and
the processing device is configured
to extract, from the captured image, biometric data related to the face; and
to recognize the competitor by comparing the extracted biometric data to stored biometric data related to the faces of the competitors.

15. The system of claim 14, further comprising a local memory or cloud memory configured to store the biometric data related to the faces of the competitors.

16. The system of claim 2 wherein:
the object-recognition device is configured to capture, as the object-recognition data, an image of a face of the competitor; and
the processing device is configured
to recognize the competitor by comparing the captured image of the face of the competitor to stored representations of faces of the competitors; and
to associate with the recognized competitor the determined time at which the recognized competitor reaches the selected one of the locations.

17. The system of claim 16, further comprising a transmitter configured to transmit the associated determined time to an output device associated with the recognized competitor.

18. The system of claim 16, further comprising a transmitter configured to transmit the associated determined time to a smart phone associated with the recognized competitor.

19. The system of claim 2 wherein:
the one or more object-recognition devices are configured to capture, as the object-recognition data, an image of a face of the competitor; and
the processing device is configured to identify images captured during the race and in which the competitor appears by comparing the captured image of the face to stored representations of faces of the competitors.

20. The system of claim 19 wherein the processing device is configured to offer for sale to the competitor at least one of the identified images.

\* \* \* \* \*